United States Patent [19]

Wakabayashi

[11] Patent Number: 4,464,998
[45] Date of Patent: Aug. 14, 1984

[54] HANGER DEVICE FOR TROLLEY CONVEYOR

[75] Inventor: Takao Wakabayashi, Toyonaka, Japan

[73] Assignee: Nakanishi Metal Works Co., Ltd., Osaka, Japan

[21] Appl. No.: 361,628

[22] Filed: Mar. 25, 1982

[51] Int. Cl.³ .............................................. B61B 10/02
[52] U.S. Cl. ...................................... 105/148; 104/89; 104/172 S; 198/678; 198/653; 294/67 BC
[58] Field of Search .............. 105/148, 149, 150, 153, 105/154, 155, 156; 269/46; 198/680, 682, 687, 678, 653, 654; 104/89, 172 S; 294/67 R, 67 B, 67 C, 67 BB, 82 AH, 67 BC

[56] References Cited

U.S. PATENT DOCUMENTS

| 282,436 | 7/1883 | Bowser | 269/46 |
| 1,903,274 | 3/1933 | Watson | 294/67 BB |
| 2,792,927 | 5/1957 | Mullen et al. | 198/682 |

FOREIGN PATENT DOCUMENTS

| 21347 | 2/1980 | Japan | 105/148 |
| 101509 | 8/1980 | Japan | 105/148 |
| 2088304 | 6/1982 | United Kingdom | 104/172 S |
| 610705 | 6/1978 | U.S.S.R. | 105/148 |
| 768709 | 11/1980 | U.S.S.R. | 105/148 |

Primary Examiner—Robert B. Reeves
Assistant Examiner—Gregory A. Beehner
Attorney, Agent, or Firm—Armstrong, Nikaido, Marmelstein & Kubovcik

[57] ABSTRACT

A hanger device for trolley conveyors includes a pair of opposed hanger arms suspended from a carrier and approximately U-shaped when seen sidewise. The two hanger arms are closed while transporting an article and are opened for loading or unloading. Each of the hanger arms comprises a fixed front hanging member, a movable rear hanging member and an extensible horizontal member connected at its opposite ends to the lower ends of the hanging members and provided with article support members inwardly projecting from and attached to its front and rear portions. In accordance with the kind of the article, the rear hanging members are suitably moved forward or rearward with the horizontal members shortened or extended, whereby the length of the hanger frame is variable.

5 Claims, 4 Drawing Figures

HANGER DEVICE FOR TROLLEY CONVEYOR

BACKGROUND OF THE INVENTION

The present invention relates to a hanger device for trolley conveyors, and more particularly to a hanger device comprising a hanger arm the length of which along the conveyor line is variable suitably in accordance with the kind of the article to be transported.

When the bodies of motor vehicles, for example, are transported on a trolley conveyor, there arises a need to open the door of the body during transport to install interior parts in the body. However, some motor vehicles have two doors and others have four doors, while the position of the door of the vehicle on a hanger alters with the size of the vehicle itself. Accordingly the hanger arm must be so designed that the doors of motor vehicles of whatever type can be opened or closed free of any trouble. Published Unexamined Japanese Utility Model Application No. 165491/1979 discloses a hanger device which is designed with consideration given to this requirement. The conventional hanger device disclosed comprises a pair of opposed hanger arms approximately L-shaped when seen sidewise and openably suspended from a carrier for loading and unloading. Each of the arms has a horizontal portion which is provided with article support members inwardly projecting and attached to its front and rear portions. The hanger arm is supported by the carrier only at one point and must therefore be reinforced by a strong member. Nevertheless, it is still likely that the hanger arm will not be supported stably. Further because the hanger arm has a definite length along the conveyor line, an elongated article, if transported, will become unstable.

SUMMARY OF THE INVENTION

The object of the present invention is to overcome the above problem and to provide a hanger device for trolley conveyors comprising a pair of opposed hanger arms approximately U-shaped when seen sidewise and openably suspended from a carrier for loading and unloading, each of the hanger arms including a front hanging member, a rear hanging member and an extensible horizontal member connected at its opposite ends to the lower ends of the hanging members, at least one of the front and rear hanging members being connected to the carrier by means for adjusting the position of the hanging member longitudinally of the hanger device, the horizontal member being provided with article support members inwardly projecting from and attached to its front and rear portions. Thus the length of the hanger arm is suitably variable along the conveyor line in accordance with the kind of the article to be transported so that the article can be handled free of interference with the arm and can be transported stably. Moreover, the hanger arm, which is supported at two points, can be supported with sufficient strength.

The present invention will be described below in greater detail with reference to the accompanying drawings.

DESCRIPTION OF THE PREFERRED EMBODIMENTS

Figure 1:
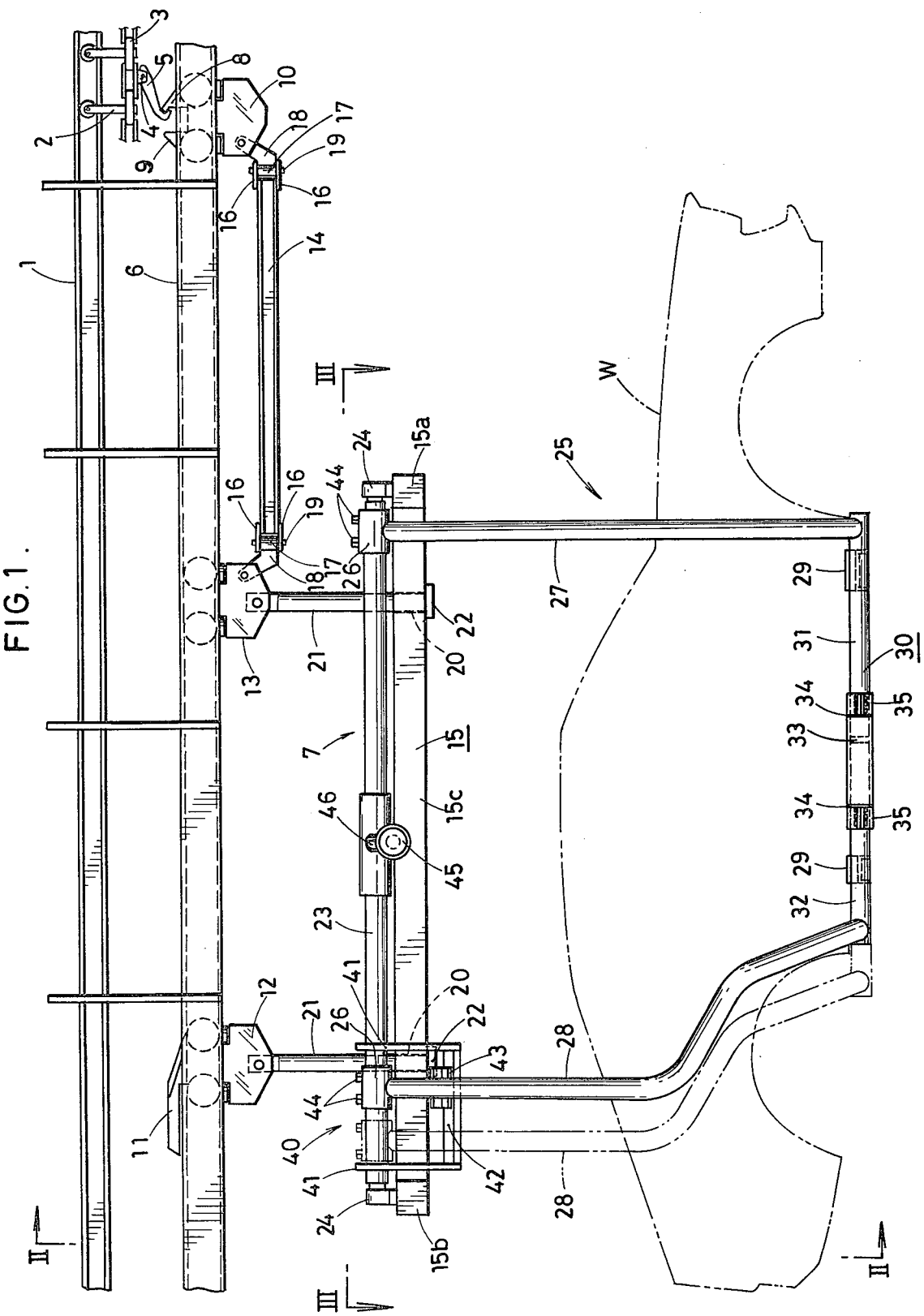
FIG. 1 is a fragmentary side elevation showing a trolley conveyor equipped with a hanger device of the present invention.

The drawings show an example of a trolley conveyor which is a power-and-free conveyor. A power rail 1 made of a steel member of I-shaped cross section is provided with a drive chain 3 suspended therefrom by a large number of power trolleys 2 and having a large number of downwardly projecting brackets 4 arranged at a specified spacing. Each of the brackets 4 has a pusher 5 which is pivoted at its upper end thereto and is upwardly or downwardly movable. A free rail 6 is disposed below the power rail 1 at a required distance therefrom. The free rail 6 is composed of a pair of steel channel members opposed to each other.

A carrier 7 includes a front free trolley 10 movable on the free rail 6 and provided with a pair of front and rear tilting dogs 8, 9, a rear free trolley 12 provided with a pusher raising cam 11 at its upper end, an intermediate free trolley 13, a first connecting member 14 connecting the front free trolley 10 to the intermediate free trolley 13, and a second connecting member 15 connecting the intermediate free trolley 13 to the rear free trolley 12. The first connecting member 14 is in the form of a bar of I-shaped cross section and fixedly has upper and lower rectangular short pieces 16 projecting from each end thereof. An L-shaped piece 18 having a vertical tubular portion 17 at its lower end is pivoted at its upper end to each of a rear portion of the front free trolley 10 and a front portion of the intermediate free trolley 13. A pin 19 extending between and attached to the pair of upper and lower short pieces 16 is inserted through the tubular portion 17. The second connecting member 15 comprises a front wing portion 15a, a rear wing portion 15b and a body portion 15c interconnecting these wing portions and is H-shaped in its entirety when seen from above. Bores 20 extend through front and rear portions of the body 15c. Downwardly extending rods 21 pivoted to central lower ends of the intermediate free trolley 13 and the rear free trolley 12 are inserted through the bores 20. The second connecting member 15 is supported by flanges 22 formed at the lower ends of the rods 21.

The carrier 7 is rotatably provided with two parallel suspending rods 23 extending longitudinally thereof. Stated more specifically, bearings 24 are mounted on the opposite end upper surfaces of the two wing portions 15a, 15b of the second connecting member 15. Each suspending rod 23 is retained at its opposite ends by the corresponding front and rear bearings 24. A pair of hanger arms 25 made of tubing, and approximately U-shaped when seen sidewise with their recessed side positioned inward when seen from the front, is suspended from the rods 23 and is openable or closable for loading or unloading an article W. Each of the hanger arms 25 comprises front and rear hanging members 27, 28 each having at its upper end a ring 26 fitting around the suspending rod 23 and secured thereto by lock bolts 44, and an extensible horizontal member 30 connected at its opposite ends to the lower ends of the hanging members 27, 28 and provided with article support members 29 inwardly projecting from and attached to front and rear portions of the member 30. When seen sidewise, the front hanging member 27 is straight, while the rear hanging member 28 is obliquely bent forwardly downward at an intermediate portion thereof so as to extend away from the portion of a motor vehicle body, i.e. the article to be transported, where a rear wheel is to be installed. The extensible horizontal member 30 comprises a front tube 31 having a front end fixed to the lower end of the front hanging member 27, a rear tube 32 having a rear end fixed to the lower end of the rear hanging member 28, and an intermediate tube 33 fitting around the rear end of the front tube 31 and the front end of the rear tube 32 to interconnect them and fastened to the two tubes 31, 32 so that at least one of the tubes 31, 32 is insertable into or withdrawable from the tube 33. The intermediate tube 33 has at each of its opposite ends a split tubular portion 35 which is formed by a laterally T-shaped cutout 34 extending from its extremity. The split tubular portion 35 has a pair of opposed lugs 37 having bolt holes 36 and formed on the opposite sides of the axial portion of the cutout 34. When nuts 39 are tightened up on bolts 38 inserted through the holes 36, the split tubular portion 35 is diametrically constricted to fasten the intermediate tube 33 to the front or rear tube 31 or 32.

Figure 2:
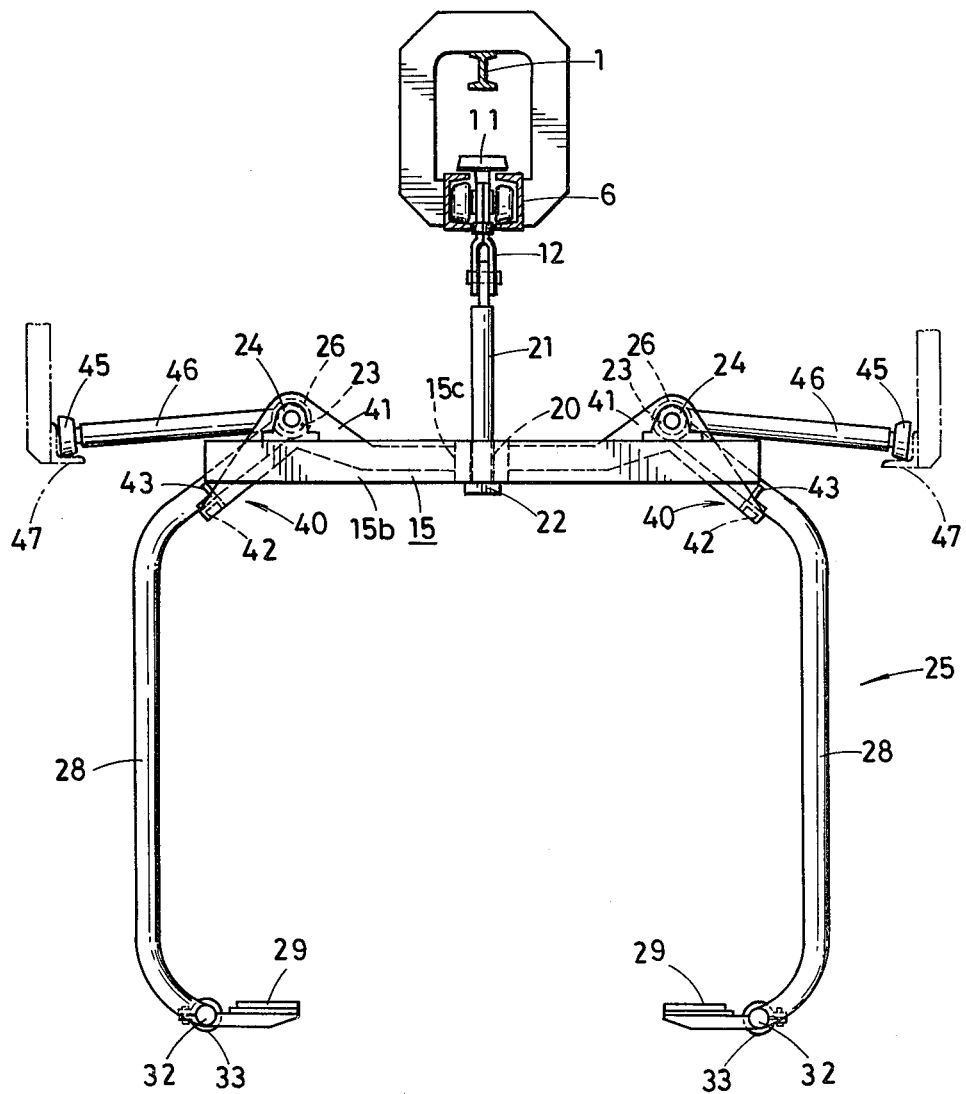
FIG. 2 is a view in section taken along the line II—II in FIG. 1 and showing the same with a drive chain omitted.
Figure 3:
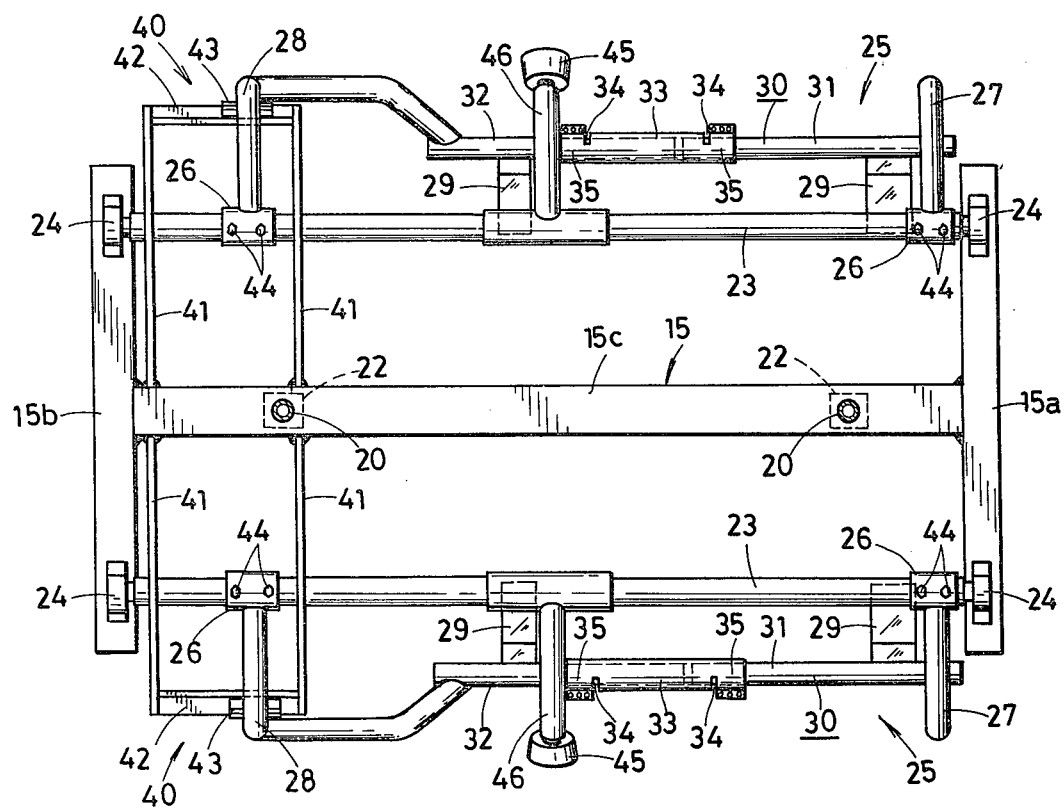
FIG. 3 is a view in section taken along the line III—III in FIG. 1.
Figure 4:
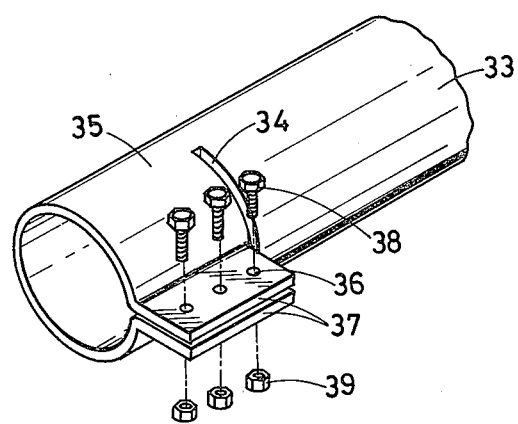
FIG. 4 is an enlarged perspective view showing an end portion of an intermediate tube.

The carrier 7 includes a stopper 40 for restraining the hanger arm 25 from pivotally moving inward. The stopper 40 comprises two parallel projecting members 41 fixed to the corresponding side of the rear end of the body portion 15c of the second connecting member 15, extending sidewise in an inverted V form when seen from the front and having the suspending rod 23 rotatably inserted therethrough, and a bearing member 42 made of channel bar and interconnecting the two projecting members 41. A contact member 43 made of angle bar and attached to the under side of a shoulder portion of the rear hanging member 28 slidably bears on the bearing member 42. The bearing member 42 and the contact member 43 are so oriented that their flat surfaces are in contact with each other. An opening or closing bar 46 outwardly extending and carrying a guide roller 45 at its forward end is fixed to an intermediate portion of each of the suspending rods 23. At a location where the article W is to be loaded on or unloaded from the pair of hanger arms 25, rails 47 are arranged for raising or lowering the guide rollers 45. The rails 47 shown in FIG. 2 are positioned for closing the pair of hanger arms 25. The rails 47 for opening the arms 25 are at a higher level than the illustrated position.

When there arises a need to elongate the illustrated hanger frame arm 25 longitudinally thereof, the bolts 38 and nuts 39 on the rear split tubular portion 35 of each intermediate tube 33 are loosened, and the lock bolts 44 are also loosened from the ring 26 of each rear hanging member 28. The rear tube 32 of the horizontal member 30 and the rear hanging member 28 are then movable together longitudinally of the frame. Accordingly the two members are moved rearward a required distance as indicated in broken lines in FIG. 1, the nuts 39 are tightened up on the bolts 38 and the lock bolts 44 are also tightened up. Thus the horizontal member 30 is elongated from the length shown in solid lines in FIG. 1 by the length corresponding to the distance of the movement, consequently elongating the hanger arm 25 by the same length longitudinally thereof. The hanger arm 25 can be shortened in a manner reverse to the above procedure.

Although the rear tube 32 of the horizontal member 30 and the rear hanging member 28 only are adjustingly movable longitudinally of the frame according to the above embodiment, the front tube 31 of the horizontal member 30 and the front hanging member 27 only may be made movable similarly. Furthermore, the front and rear tubes 31, 32 of the horizontal member 30 and the front and rear hanging members 27, 28 may be made adjustingly movable similarly. The structure for rendering the horizontal member 30 extensible is not limited only to the illustrated one; the member 30 can be telescopic. One of the opposed projecting members 41 included in the present embodiment need not always be fixed to the body portion 15c of the second connecting member 15 but may have such a length as to extend from the bearing member 42 to the suspending rod 23.

What is claimed is:

1. A hanger device for a trolley conveyor including a carrier comprising:
   a pair of opposed hanger arms approximately U-shaped when seen sideways, said hanger arms being openably suspended from said carrier for loading or unloading an article;
   each of said hanger arms including a front hanging member, a rear hanging member, and an extensible horizontal member connected at its opposite ends to the lower ends of said hanging members, said extensible horizontal members being positioned in and extensible in the same plane;
   means for adjusting the relative positions of said front and rear hanging members on said carrier longitudinally of said hanger device;
   said horizontal member being provided with article support members attached to its front and rear portions and projecting inwardly therefrom.

2. A hanger device as defined in claim 1 wherein said position adjusting means comprises a suspending rod attached to said carrier and extending longitudinally thereof, a ring fixed to the upper end of at least one of said hanging members and slidably fitted around said suspending rod, and a lock bolt for fastening said ring to said suspending rod.

3. A hanger device as defined in claim 1 wherein said extensible horizontal member comprises a front tube having a front end fixed to the lower end of said front hanging member, a rear tube having a rear end fixed to the lower end of said rear hanging member, and an intermediate tube fitting around the rear end of said front tube and the front end of said rear tube to interconnect these ends, said intermediate tube being adjustably fastened to at least one of the two tubes so that said one of the tubes is insertable into or withdrawable from said intermediate tube.

4. A hanger device as defined in claim 3 wherein said intermediate tube has at each of its opposite ends a split tubular portion formed by a laterally T-shaped cutout extending axially inwardly from its extremity and then partially circumferentially in each direction, said split tubular portion being provided with a pair of opposed lugs having bolt holes therethrough, said lugs being formed on the opposite sides of the axial portion of said cutout.

5. A hanger device for a trolley conveyor comprising:
   a carrier;

two parallel suspending rods rotatably attached to said carrier and extending longitudinally thereof;

a hanger arm suspended from each of said suspending rods, said hanger arms being approximately U-shaped when viewed from the side;

each of said hanger arms comprising front and rear hanging members each having at its upper end a ring fitting around said suspending rod, the lower ends of said front and rear hanging members of each hanger arm being connected by a horizontal member extensible in the same plane, and being provided with article support members projecting inwardly therefrom;

said ring of said front hanging member and said ring of said rear hanging member being axially movable on said suspending rod with respect to each other;

said horizontal member comprising a front tube having a front end fixed to the lower end of said front hanging member, a rear tube having a rear end fixed to the lower end of said rear hanging member, and an intermediate tube fitting around the rear end of the front tube and the front end of the rear tube to interconnect these ends and being fastened to said tubes so that at least one of said tubes is insertable into and withdrawable from said intermediate tube;

a stopper provided on said carrier for restraining each of said hanger arms from pivotally moving inward, said stopper comprising two parallel projecting members extending sidewise from said carrier and a bearing member interconnecting said two projecting members; and a contact member on one of said hanging members of each hanger arm so as to be slidably borne on the bearing member of the stopper associated with that hanger arm.

* * * * *